United States Patent [19]

Jaggers

[11] Patent Number: 5,076,596
[45] Date of Patent: Dec. 31, 1991

[54] TOP JAW AND WEDGE CONNECTOR

[75] Inventor: James R. Jaggers, Ft. Lauderdale, Fla.

[73] Assignee: Huron Machine Products, Inc., Ft. Lauderdale, Fla.

[21] Appl. No.: 681,714

[22] Filed: Apr. 8, 1991

[51] Int. Cl.⁵ .............................................. B23B 31/16
[52] U.S. Cl. .................................... 279/123; 279/110
[58] Field of Search ...................... 279/1.5 J, 110, 123

[56] References Cited

U.S. PATENT DOCUMENTS

| | | | |
|---|---|---|---|
| 2,667,358 | 1/1954 | Highberg | 279/123 |
| 3,219,356 | 11/1965 | Wilterdink et al. | 279/123 |
| 3,744,808 | 7/1973 | Hughes | 279/1.5 J |
| 4,029,325 | 6/1977 | Rohm | 279/123 |
| 4,569,530 | 2/1986 | Cross | 279/123 |
| 4,667,971 | 5/1987 | Norton et al. | 279/123 X |

*Primary Examiner*—Steven C. Bishop
*Attorney, Agent, or Firm*—Malin, Haley, McHale, DiMaggio & Crosby

[57] ABSTRACT

A top jaw system for securing a top jaw in position above a chuck on a milling machine, lathe or the like is provided. A protrusion extends upward from the chuck and is preferably attached to the chuck by rigid attachment to a jaw nut which is positioned in a common master jaw on the chuck. The protrusion has a flat face which extends upward and over the jaw nut to form an acute angle with the jaw nut. A top jaw having a slot sized to receive the protrusion is placed over the protrusion. The top jaw has a pin aperture extending through the top jaw through the slot at a right angle to the protrusion when the top jaw is placed on the protrusion. When the top jaw is placed on the protrusion, an elongated pin having a flat surface extending along its elongated axis is placed in the pin aperture. The flat face of the protrusion is pushed into contact with the flat surface of the pin. This is preferably done a set screw extending through the top jaw and contacting the protrusion opposite the flat face. Downward pressure is applied to the top jaw through the pin to clamp the top jaw onto the top of the master jaw.

6 Claims, 4 Drawing Sheets

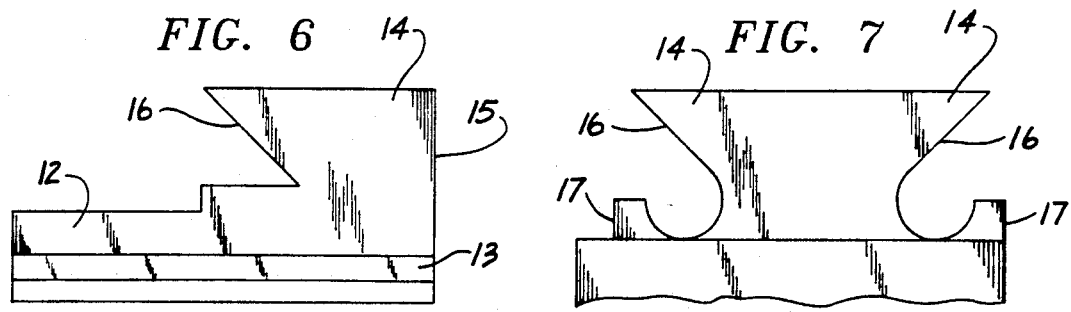
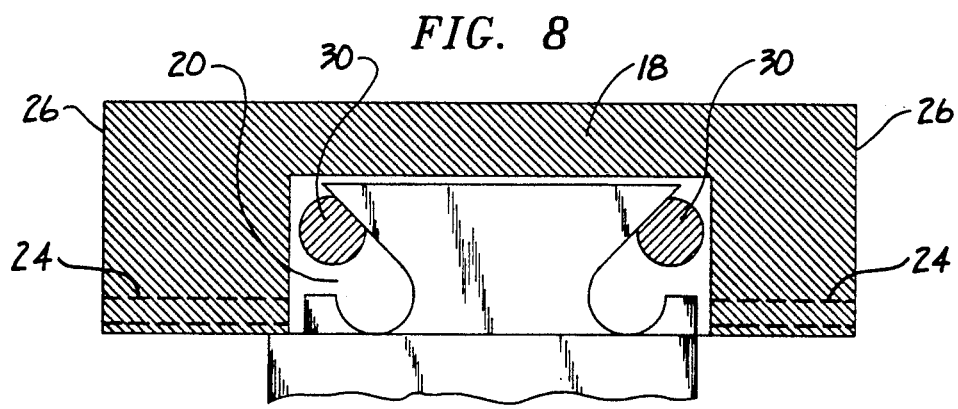
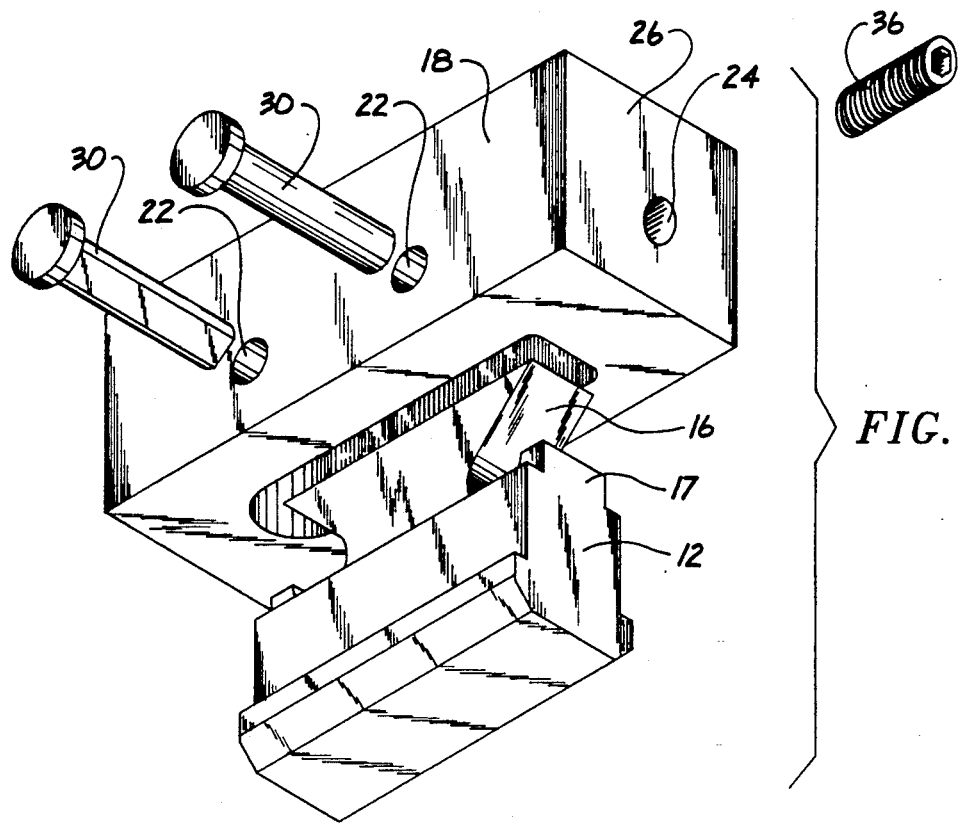

TOP JAW AND WEDGE CONNECTOR

BACKGROUND OF THE INVENTION

1. Field of the Invention

The instant invention relates to top jaws for use on chucks on lathes, milling machines and the like and more particularly to top jaws which can be easily and rapidly interchanged without removing the means by which the top jaw is attached to the chuck.

2. Description of the Related Art

In the art, chucks on milling machines, lathes or the like typically have channels cut into their outer surface. These channels extend radially outward from the center of the chuck. Master jaws are placed in the channels and attached to hydraulic means for moving the master jaws along the channels. These master jaws typically have inverted T-shaped channels extending along their lengths for receiving and securing jaw nuts which are in turn connected to the top jaws.

A jaw nut corresponding in shape to the inverted T-shaped channel of the master jaw is slid along the master jaw to a desired position on the chuck. A top jaw is typically placed on the top surface of the jaw nut above the plane of the outer surface of the chuck. Removable bolts extend downward through the top jaw into threaded recesses in the jaw nut. Upon tightening the bolts, the top jaw is drawn downward into contact with the top surface of the master jaw while the jaw nut is drawn upward into contact with channels in the master jaw. This process locks the top jaw in position on the master jaw.

In order to replace the prior art top jaws, these bolts are removed allowing the top jaw to be pulled away from contact with the upper surface of the jaw nut and master jaw. A new top jaw is positioned above the jaw nut and bolts are passed through the top jaw into contact with the threaded recesses in the jaw nut. The bolts are tightened drawing the top jaw into contact with the upper surface of the master jaw and the jaw nut into contact with the contours of the T-shaped channel.

Aligning and re-threading the bolts through the top jaw into the jaw nut requires considerable manipulation and precise alignment. For this reason, the changing of a top jaw is time consuming and is often very difficult. This is a problem in want of a solution.

SUMMARY OF THE INVENTION

A wedge-shaped projection called a wedge, having a flat angled contact face, is provided. The wedge is placed on the top of a conventional jaw nut which is in turn placed within a conventional master jaw of a chuck. The angled contact face is angled upward and over the jaw nut so that an acute angle is formed between the angled contact face and the top of the jaw nut.

A top jaw having a slot corresponding in size to the wedge is provided. The top jaw is placed on the wedge so that the wedge extends upward into the slot of the top jaw. The top jaw has a pin aperture extending through the slot parallel to the angled contact face of the wedge. A pin having a flat angled surface along its longitudinal length is placed through the pin aperture in the top jaw. When the pin is placed in position within the pin aperture and the wedge pushed toward the pin, the angled surface of the pin contacts the angled contact face of the wedge.

A set screw extends through a threaded aperture in the top jaw and contacts the wedge at its back opposite the angled contact face. Turning the set screw pushes the set screw against the back of the wedge. When the top jaw is placed over the wedge, further turning of the set screw drives the angled contact face of the wedge against the flat angled surface of the pin. Because of the acute angle between the angled contact face of the wedge and the top of the jaw nut, when the set screw pushes the wedge against the flat angled surface of the pin, the wedge rides up over the pin. This puts downward pressure on the pin and consequently on the top jaw which pushes the top jaw into contact with the top surface of the master jaw. Upward movement of the wedge causes the jaw nut to be drawn upward into contact with the correspondingly shaped channel of the master jaw. This contact between the jaw nut and the channels of the master jaw on one side and between the top jaw and outer surface of the master jaw on the other side securely positions the top jaw on the master jaw.

In replacing the top jaw, the set screw is loosened removing the contact pressure between the pin and the wedge. This allows the pin to be removed from the pin aperture. Then the top jaw may be lifted off the wedge and away from the master jaw. Thereafter, a new top jaw having a slot, pin aperture, set screw and set screw aperture is inserted over the wedge. The pin is replaced through the pin aperture exactly as before so that the flat angled surface of the pin comes into contact with the angled contact face of the wedge. The set screw in the threaded aperture in the new top jaw is then tightened placing pressure on the contact between the pin and the wedge. This contact between the wedge and pin holds the new top jaw in position above the master jaw as described above.

With the instant invention, the process of exchanging top jaws is speeded considerably. With the prior art top jaws about ten minutes was needed to change the top jaws. With the instant invention about two minutes are needed to change top jaws. Further, because there is no need for precise alignment of bolts and recesses, the ease with which top jaws are exchanged is considerably improved.

In view of the foregoing, and in consideration of the following detailed description, it is an object of the instant invention to provide a top jaw system which allows one top jaw to be easily exchanged with another top jaw.

It is another object of the instant invention to provide a top jaw which may be rapidly exchanged with another top jaw.

It is a further object of the instant invention to provide a top jaw which may be easily aligned along the master jaw.

It is a further object of the instant invention to provide a top jaw which may is inexpensive and easy to manufacture.

These and other objects will become obvious from the following detailed description in which like elements are referred to by like numerals.

BRIEF DESCRIPTION OF THE DRAWINGS

FIG. 6 is a side elevational view of the jaw nut and wedge of the preferred embodiment of the invention.

FIG. 7 is a side elevational view of an alternate embodiment of the invention showing two opposing wedges.

FIG. 8 is a cut-away view of the alternate embodiment of the invention of FIG. 7.

FIG. 9 is an exploded view of the alternate embodiment of the invention of FIG. 7.

DETAILED DESCRIPTION OF THE INVENTION

Figure 5:
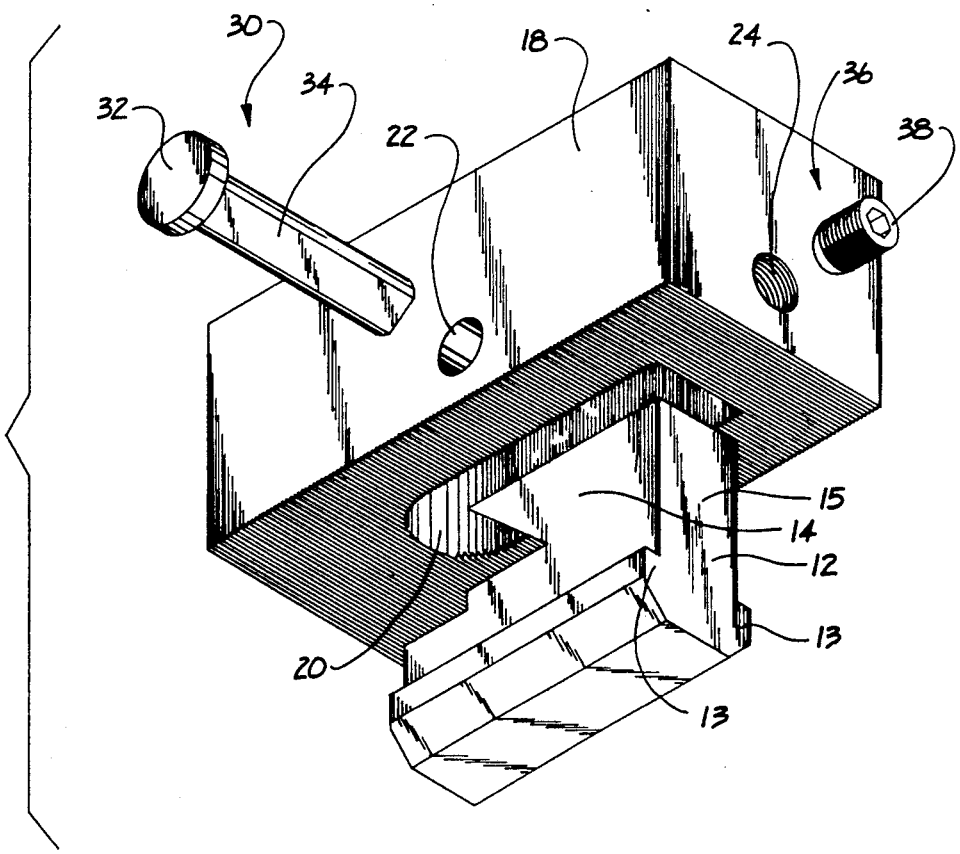
FIG. 5 is an exploded view of the invention of FIG. 1.
Figure 10:
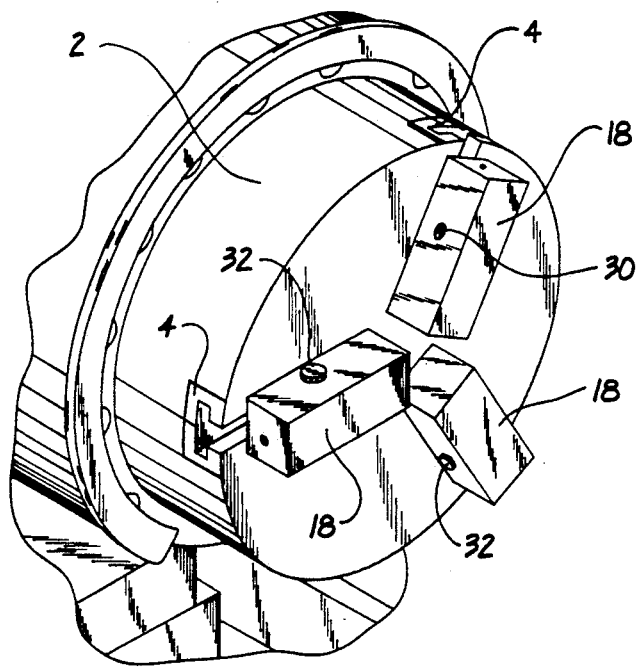
FIG. 10 is a perspective view of the top jaws in position on a chuck.

Referring first to FIG. 5, an exploded view of the preferred embodiment of the invention, the invention includes a jaw nut 12 having a pair of outwardly extending flanges 13 and an upwardly protruding wedge 14. The jaw nut 12 and extending flanges 13 are shaped as is common in the art to conform to the inverted "T"-shaped channel of the master jaw 4 on a chuck 2 (FIG. 10).

A top jaw 18 is provided having an elongated slot 20 extending into top jaw 18 from the side of the top jaw 18 directed toward the chuck 2. The elongated axis of slot 20 is parallel to the axis of master jaw 4 when top jaw 18 is in position on master jaw 4 as will be described. A pin aperture 22 extends entirely through top jaw 18 passing through slot 20 at a right angle to the elongated axis of slot 20. A threaded screw aperture 24 is provided through top jaw 18 into slot 20. Screw aperture 24 is directed along the elongated axis of the slot 20 from one face of top jaw 18 into slot 20. Top jaw 18 has at least one work piece end 26 configured to contact and hold a work piece 1 when top jaw 18 is attached to master jaw 4. A pin 30 and a screw 36 are also provided as will be described in detail hereafter.

As shown in FIG. 6, the wedge 14 has a back 15 on one end and an angled contact face 16 opposite back 15. Contact face 16 is flat and extends entirely across the surface of wedge 14. Contact face 16 extends upward from the top of jaw nut 12 and over jaw nut 12 at an acute angle.

Figure 1:
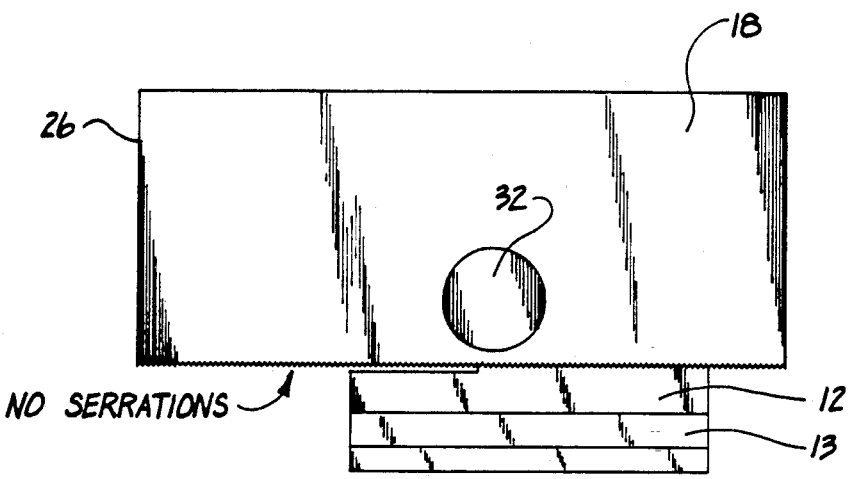
FIG. 1 is a side elevational view of the invention.
Figure 2:
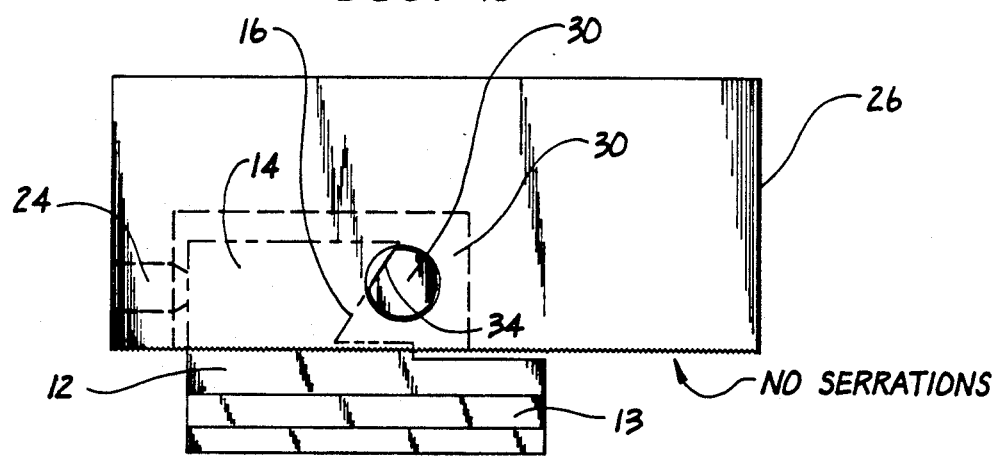
FIG. 2 is a side elevational view of the opposite side of FIG. 1 showing the wedge, slot and set screw in phantom.

Slot 20, as shown in FIGS. 2 and 5 is slightly larger in length and approximately the same width as wedge 14. In operation, top jaw 18 is placed over wedge 14 so that wedge 14 extends into slot 20.

Figure 3:
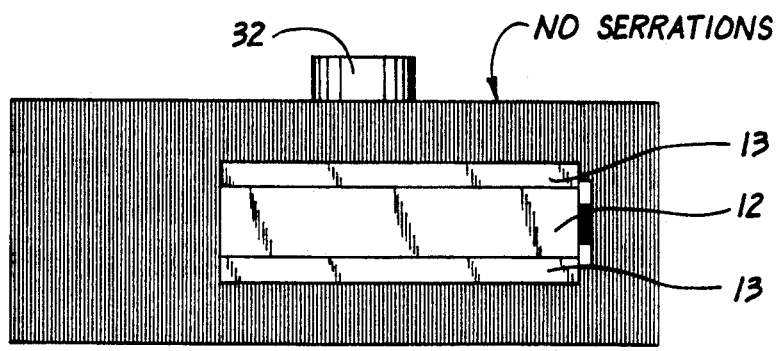
FIG. 3 is a bottom view of the invention of FIG. 1.
Figure 4:
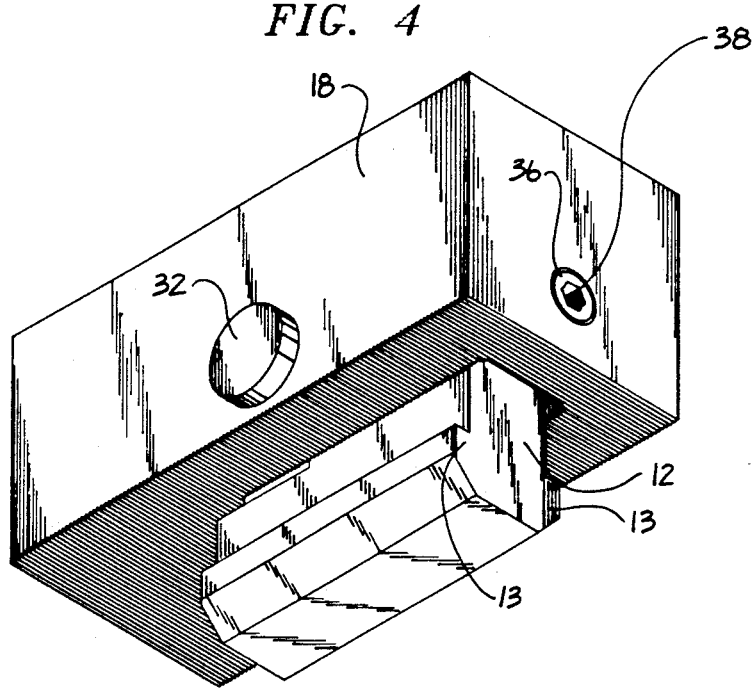
FIG. 4 is a perspective view of the assembled invention of FIG. 1.

Pin 30 has a flat angle face 34 (FIG. 5) extending entirely along the length of pin 30. Pin 30 also has a pin head 32 which is larger in cross sectional circumference than pin 30. When top jaw 18 is placed on wedge 14 so that wedge 14 extends into slot 20, pin 30 is placed through pin aperture 22 in top jaw 18 so that the angle face 34 of pin 30 comes in contact with the flat contact face 16 of wedge 14. Pin 30 is manually pushed through pin aperture 22 so that pin head 32 comes in contact with the outside surface of top jaw 18 (FIG. 3). Contact between pin head 32 and top jaw 18 prevents pin 30 from passing entirely through pin aperture 22.

Screw aperture 24 extends through top jaw 18 into slot 20 at a position corresponding to the back 15 of wedge 14. Screw aperture 24 is threaded to receive a threaded screw 36. Screw 36 has screw head 38 for turning screw 36 in screw aperture. Screw head 38 is preferably machined to receive an Allen wrench, but may include any common screw manipulating surface such as a bolt head or a screwdriver receiving slot.

After top jaw 18 has been placed over wedge 14 and the angle face 34 of pin 30 placed in contact with the contact face 16 of wedge 14, screw 36 is threaded through screw aperture 24 into contact with the back 15 of wedge 14. Contact between screw 36 and the back 15 of wedge 14 pushes wedge 14 toward pin 30. Because of the angled contact face 16 of wedge 14, wedge 14 tends to rise upward with respect to pin 30 as pressure is applied on wedge 14 through screw 36. The upward movement of wedge 14 correspondingly moves jaw nut 12 upward. This upward movement of jaw nut 12 moves flanges 13 into contact with the corresponding channels in master jaw 4. This brings jaw nut 12 into solid and secure contact with master jaw 4.

The upward movement of wedge 14 puts downward pressure on pin 30 which is transferred to top jaw 18 through the contact of pin 30 with pin apertures 22. This downward pressure on top jaw 18 places top jaw 18 into contact with the upper surface of master jaw 4. Therefore, as screw 36 is tightened, top jaw 18 moves downward into contact with the top surface of master jaw 4 while jaw nut 12 moves upward in master jaw 4 so that the entire device 10 is securely positioned above master jaw 4.

The angle of contact face 16 to the upper surface of jaw nut 12 is chosen so that pressure from scew 36 onto the back 15 of wedge 14 produces both forward and downward pressure on pin 30. Forward pressure means pressure moving contact face 16 toward pin 30. Downward pressure means pressure pushing pin 30 toward the upper surface of master jaw 4. Downward pressure on pin 30 produces a corresponding upward pressure on wedge 14 which is transferred to jaw nut 12.

As the angle of the contact face 16 to the top of jaw nut 12 approaches ninety degrees, the amount of downward pressure applied to top jaw 18 and corresponding upward pressure applied to jaw nut 12 is minimized. On the other hand, as the angle of contact face 16 to top of jaw nut 12 approaches zero, screw 36 must be threaded through screw aperture 24 a large distance to produce sufficient downward force on top jaw 18 and upward force on jaw nut 12 to securely clamp the device 10 above master jaw 4. In practice, an angle for contact face 16 of forty-five degrees has been found particularly effective. However, it is recognized that considerable variation in this angle is permitted by the invention according to the individual needs to which the device is subjected. The important factor is that when pressure is applied by screw 36 to the back 15 of wedge 14, both downward and forward pressure is applied to pin 30 through wedge 14.

Each master jaw 4 on chuck 2 is attached to hydraulic devices, as is common in the art, for moving master jaws 4 along the recesses in chuck 2. Movement of master jaws 4 also moves top jaws 18 when top jaws 18 are attached to jaw nuts 12 through wedges 14 as described above.

Each top jaw 18 has at least one work piece end 26 configured to contact and hold a work piece 1 when the master jaws 4 are moved along the recesses in chuck 2. For most applications, work piece 1 will be located at the center of chuck 2 so that master jaws 4 will move toward the center of chuck 2 thereby pushing work piece end 26 of top jaws 18 into contact with workpiece 1. However, for grasping the interior of pipes and the like, work piece end 26 may be directed away from the center of chuck 2 and master jaws 4 moved outward of chuck 2 allowing the inside surface of the work piece pipe or similar item to be grasped.

FIG. 10 shows three of the devices 10 placed in position on chuck 2. Each device 10 is positioned on a master jaw 4 in the chuck 2. The master jaws 4 are placed in chuck 2 along radials extending from the center to the outer edge of chuck 2.

When it is desired to replace a top jaw 18 with an alternate top jaw 18, screw 36 is loosened by manipulating screw head 38 by an appropriate Allen wrench, socket wrench, screw driver or the like. It is not necessary to entirely remove screw 36 from screw aperture 24 as a slight loosening of screw 36 removes the pressure of wedge 14 on pin 30. With removal of the pressure between wedge 14 and pin 30, the downward pressure on top jaw 18 and upward pressure on jaw nut 12 is removed. Pin 30 is then free to be removed from pin aperture 22 in top jaw 18. With pin 30 removed, top jaw 18 may be lifted off of wedge 14. Thereafter, a new top jaw 18' having a slot 20' as described above may be placed over wedge 14. The original or a new pin 30' is placed through pin aperture 22' in the new top jaw 18' so that the angle face 34' of pin 30' contacts the contact face 16 of wedge 14. Thereafter screw 36', which preferably remains in the screw aperture 24' in each top jaw 18', is manipulated by screw head 38' into contact with the back 15 of wedge 14 as described above. The turning of screw 36' into screw aperture 24' tightens the new top jaw 18' and jaw nut 12 in position above master jaw 4 exactly as described above.

The entire procedure for replacing one top jaw 18 with another can be rapidly and easily accomplished by the instant invention and does not require the precise alignment and manipulation of bolts into threaded apertures in the jaw nuts as had previously been required. Typically, the time required to change a top jaw has been reduced from about ten minutes to about two minutes.

FIGS. 7 through 9 show an alternate embodiment of the instant invention where, instead of a single wedge 14, two wedges 14" having corresponding contact faces 16" are provided on a conventional jaw nut 12", directed oppositely to each other. Also provided are screw stops 17 aligned with screw apertures 24" in top jaw 18". Screw stops 17 allow screws 36" to contact and subsequently apply pressure to wedges 14" in a similar way that back 15 allows screws 36 to apply pressure to wedge 14.

In this embodiment, a top jaw 18" having a slot 20" is provided as before. However, instead of a single pin aperture 22, dual pin apertures 22" are provided extending through slot 20" and positioned to allow a corresponding pin 30" to contact an appropriate contact face 16". Further, instead of a single screw aperture 24, dual screw apertures 24" are provided on opposite ends of top jaw 18" to allow corresponding screws 36" to be threaded into slot 20".

In this embodiment, it is not intended that two pins 30" should be simultaneously used to contact both contact faces 16". Instead depending on which work piece end 26 will contact the work piece 1, the pin aperture 22" closest to that work piece end 26 is selected for the insertion of the pin 30". Thereafter, the screw 36" opposite the active work piece end 26 is tightened so that top jaw 18" is brought into secure contact with the master jaw 4 exactly in accordance with the principles of the invention described in connection with the preferred embodiment.

Figure 11:
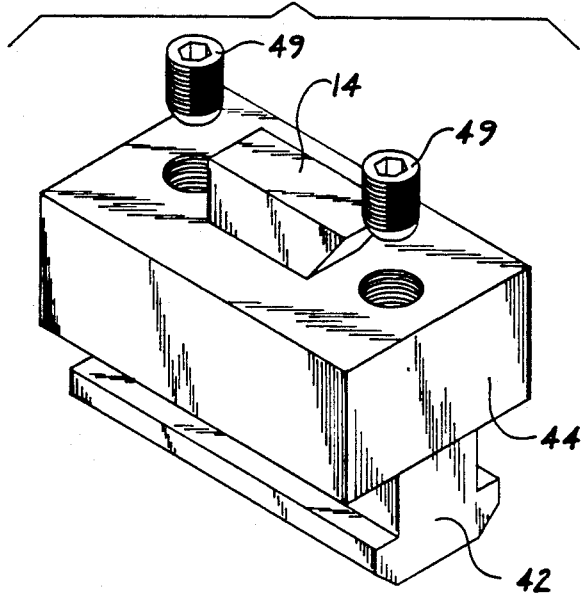
FIG. 11 is an exploded perspective view of an alternate embodiment of the invention with the wedge attached to a conventional top jaw above a jaw nut.

FIG. 11 shows another alternate embodiment of the invention. In this embodiment, a traditional jaw nut 42 is provided which is attached to a top jaw 44 through set screws 49 extending through top jaw 44 into jaw nut 42 as is commonly done in the prior art. In this embodiment, the tightening of screws 49 draws top jaw 44 toward jaw nut 42. This clamps top jaw 44 and jaw nut 42 onto master jaw 4 thereby securely positioning top jaw 44.

A wedge 14, identical to the wedge 14 described in connection with the preferred embodiment, is placed on the upper surface of top jaw 44 extending away from top jaw 44. After top jaw 44 has been secured in position above master jaw 4 according to the teachings of the prior art, an additional top jaw 48 having a slot 20 is provided to be placed over the top of wedge 14 on top jaw 44. This new top jaw 48 is identical in every way to top jaw 18 of the preferred embodiment and described in detail above.

In operation, the new top jaw 48 is placed over the wedge 14 so that wedge 14 protrudes into slot 20. Pin 30 is placed through the pin aperture 22. Thereafter, screw 36 is tightened through the screw aperture 34 into contact with the back 15 of wedge 14. In this embodiment, instead of drawing the top jaw 18 into contact with the upper surface of the master jaw 4, the top jaw 18 is drawn into contact with the upper surface of top jaw 44. In all other respects, the operation of this embodiment is identical to that described above in connection with the preferred embodiment.

Figure 12:
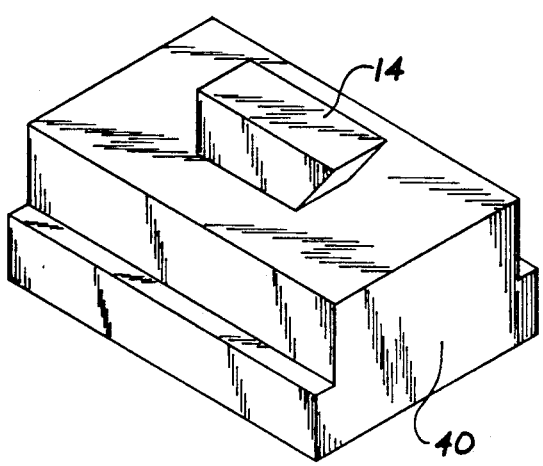
FIG. 12 is an alternate embodiment of the invention showing a wedge attached to a master jaw.

FIG. 12 shows yet another embodiment of the instant invention where the wedge 14 is attached directly to a blank 40. Wedge 14 is placed on the most outward surface of blank 40. This blank 40 is sized to fit exactly into the slot cut in the chuck 2 for normally retaining a master jaw 4. In this embodiment, blank 40 is held in place on chuck 2 by hydraulic attachments exactly as master jaw 4 is held in place on chuck 2. In this embodiment, wedge 14 is identical to the wedge 14 described in connection with the preferred embodiment. A top jaw 18 identical to that in the preferred embodiment is placed over the wedge 14 and functions exactly as described in connection with the preferred embodiment.

The instant invention has been described in connection with specific embodiments. It is recognized that changes and modifications may be made to the description given above and still be within the scope of the invention as claimed. Further, it is clear that obvious changes and modifications will occur to those skilled in the art.

What is claimed is:

1. A top jaw system for securing a top jaw in position above a chuck comprising:
   (a) a protrusion extending upward from said chuck, said first protrusion having at least one flat angled contact face, directed along radials extending outward from the center of said chuck, each of said angle contact faces forming an acute angle with the plane of the outer surface of said chuck;

(b) means, attached to said protrusion, for attaching said protrusion to said chuck;

(c) an elongated pin having a flat surface extending along said pin parallel to the elongated axis of said pin;

(d) a top jaw having a face disposed toward said chuck including:

a slot sized to receive said protrusion, said slot extending from said face of said top jaw into said top jaw;

at least one pin aperture, each corresponding to a said flat angled contact face and each sized to receive said pin, each of said pin apertures extending through said top jaw and through said slot, each of said pin apertures extending through said top jaw at a right angle to said corresponding angled contact face when said protrusion is positioned in said slot; and, means for moving a said angled contact face into contact with said flat surface of said pin when said protrusion is positioned in said slot and said pin is placed in said pin aperture corresponding to said angled contact face;

whereby said top jaw is placed over said protrusion so that said protrusion extends into said slot and said pin is placed through a said pin aperture corresponding to said angled contact face, whereafter said flat surface of said pin comes into contact with said flat angled contact face of said protrusion when said means for moving said angled contact face moves said contact face into contact with said flat surface of said pin thereby causing said angled contact face of said protrusion to move upward over said pin thereby placing downward pressure on said pin and said top jaw and simultaneous upward pressure on said means for attaching said first protrusion to said chuck.

2. The system of claim 1 wherein said means for attaching said protrusion to said chuck includes:

(a) a master jaw placed in recesses in said chuck, said master jaw having a channel extending along its length; and, (b) a jaw nut shaped to correspond to said channel in said master jaw so that said jaw nut may be moved along said channel in said master jaw constrained in its movement by the boundaries of said channel.

3. The system of claim 1 wherein said pin includes a pin head having a diameter larger than said pin aperture whereby said pin head contacts said top jaw thereby locating said pin in said pin aperture.

4. The system of claim 1 wherein said means for moving said angled contact face comprises a threaded screw extending through a threaded aperture in said top jaw opposite a respective flat angled contact face, said threaded aperture extending into said slot; and, means for turning said threaded screw in said threaded aperture so that said threaded screw, contacts opposite said protrusion opposite said flat angled contact face thereby putting pressure on said protrusion and said flat surface of said pin when said flat angled contact face is in contact with said flat surface.

5. The system of claim 1 wherein said protrusion has two flat angled contact faces, said flat angle contact faces directed oppositely from each other, both said angle contact faces of said protrusion forming an acute angle with the plane of the outer surface of said chuck; and, wherein said slot of said top jaw is sized to receive both said flat angled contact faces; and, wherein said top jaw includes two pin apertures each corresponding to a said flat angled contact face and each sized to receive said pin, each of said pin apertures extending into said top jaw and through said slot, each of said pin apertures extending through said top jaw at a right angle to said corresponding angle contact face of said protrusion when said protrusions is positioned in said slot and said pin is placed in said respective pin aperture;

whereby when said top jaw is placed over said protrusions so that said protrusion extends into said slot, said pin may be placed through either said pin aperture so that said flat surface of said pin comes into contact with said flat angled contact surface of said corresponding flat angled contact surface when said means for moving said flat angled contact face moves the appropriate said flat angled contact face into contact with said flat surface of said pin thereby causing said appropriate flat angled contact face to move upward over said pin thereby placing downward pressure on said pin and said top jaw and simultaneously placing upward pressure on said means for attaching said protrusion to said chuck.

6. A top jaw system for securing a top jaw in position above a chuck comprising:

(a) a protrusion extending upward from said chuck, said first protrusion having at least one flat angled contact face directed along radials extending outward from the center of said chuck, each of said angle contact faces forming an acute angle with the plane of the outer surface of said chuck;

(b) means, attached to said protrusion, for attaching said protrusion to said chuck including:

(i) a master jaw placed in recesses in said chuck, said master jaw having a channel extending along its length; and, (ii) a jaw nut shaped to correspond to said channel and said master jaw so that said jaw nut may be moved along said channel in said master jaw constrained in its movement by the boundaries of said channel;

(c) an elongated pin having a flat surface extending along said pin parallel to the elongated axis of said pin, said pin also having a pin head having a diameter larger than the cross-section of said pin;

(d) a top jaw having a face disposed towards said chuck including:

a slot sized to receive said protrusion, said slot extending from said face of said top jaw into said top jaw;

at least one pin aperture sized to receive said pin, each of said pin apertures extending into said top jaw and through said slot, each of said pin apertures extending through said top jaw at a right angle to said corresponding angled contact face when said protrusion is positioned in said slot; and, means for moving a said angled contact face into contact with said flat surface of said pin when said protrusion is positioned in said slot and said pin is placed in said first pin aperture corresponding to said angled contact face, said means for moving comprising:

(i) a threaded screw extending through a threaded aperture in said top jaw opposite a respective flat angled contact face, said threaded aperture extending into said slot; and, (ii) means for turning said threaded screw in said threaded aperture so that said threaded screw contacts said protrusion opposite said flat angled contact face thereby putting pressure on said protrusion and said flat surface of said pin when said flat angled contact face is in contact with said flat surface;

whereby said top jaw is placed over said protrusion so that said protrusion extends into said slot and said pin is placed through a said pin aperture corresponding to said flat angled contact face, whereafter said flat surface of said pin comes into contact with said flat angled contact face of said protrusion when said means for moving said angled contact face moves said contact face into contact with said flat surface of said pin thereby causing said angled contact face of said protrusion to move upward over said pin thereby placing downward pressure on said pin and said top jaw and simultaneous upward pressure on said means for attaching said first protrusion to said chuck.

* * * * *